United States Patent [19]

Buzzi et al.

[11] 4,030,573

[45] June 21, 1977

[54] APPARATUS DRIVEN BY AN ELECTRIC MOTOR

[75] Inventors: Leo Buzzi; Valentin Buzzi; Walter Opietnik; Helmut Liebl; Peter Malobabic, all of Klagenfurt, Austria

[73] Assignee: U.S. Philips Corporation, New York, N.Y.

[22] Filed: Jan. 7, 1976

[21] Appl. No.: 647,119

[30] Foreign Application Priority Data

Jan. 10, 1975 Austria ............................ 156/75

[52] U.S. Cl. .................................. 188/1 B; 30/45

[51] Int. Cl.² ........................................ F16F 7/10

[58] Field of Search .................. 30/44, 45; 188/1 B; 248/18

[56] References Cited

UNITED STATES PATENTS

| | | | |
|---|---|---|---|
| 2,567,375 | 11/1951 | Harshberger | 30/44 |
| 2,639,195 | 5/1953 | Bock | 188/1 B UX |
| 2,721,028 | 10/1955 | Dills | 188/1 B UX |
| 3,321,831 | 5/1967 | Harr et al. | 30/45 |
| 3,480,848 | 11/1969 | Church | 30/45 X |

*Primary Examiner*—Duane A. Reger
*Attorney, Agent, or Firm*—Frank R. Trifari; Rolf E. Schneider

[57] ABSTRACT

In an electromotorically driven apparatus with an apparatus component which can be driven by a drive element and which performs a reciprocating vibratory movement, strip-shaped integral hinges are provided for the parallel guidance of said apparatus component. To increase the life of the integral hinges, at least one spring which exerts a force component in the direction of the vibratory movement is provided for each of the integral hinges.

9 Claims, 6 Drawing Figures

APPARATUS DRIVEN BY AN ELECTRIC MOTOR

The invention relates to an electromotively driven apparatus with a component, such as a tool or a vibrating bridge adapted to co-operate with a tool, which can be driven by a drive element and which performs a reciprocating vibratory movement. For parallel guidance, each of the component sides which face each other in the direction of the vibratory movement is provided with at least one strip-shaped integral hinge, one end of which is hinged to the drivable apparatus component to be guided in parallel, and the other end of which is hinged to a stationary part of the apparatus.

Such integral hinges, as for example described in OE-PS 310,614 and OE-PS 313,102, enable a very good parallel guidance, of the apparatus component which performs a reciprocating vibratory movement, to obtained in a simple manner. This is important for numerous applications, as for example in the case where the apparatus component is a massage attachment, a nail polisher or the driven cutter of a dry-shaver or a hair trimmer. However, in practice it has been found that the lifetime of such integral hinges is not very long and that their spring properties are subject to substantial tolerances in the case of series production.

It is therefore the primary object of the invention to mitigate the foregoing problems.

The foregoing object is realized in an apparatus of the type mentioned in the preamble in that with each of the two integral hinges there is associated at least one spring, preferably taking the form of a helical spring, which exerts a force component in the direction of the vibratory movement. The spring acts between the drivable apparatus component to be guided in parallel and a stationary part of the apparatus. Thus, the integral hinges first of all provide the parallel guidance, whereas the additional springs take up the alternately occurring tensile and pressure loads, so that the life of the integral hinges is substanitally prolonged. Moreover, the desired spring properties can now be obtained by apropriately dimensioning the springs associated with the integral hinges, which is especially important in view of the desired choice of the resonant frequency of the vibrating system in each case.

It has further proved advantageous for the spring to exert a further force component which is directed perpendicularly to the vibratory movement and which tensions the integral hinge. Thus, it is ensured that the integral hinges remain tensioned as well in the case of unfavourable loading of the drivable apparatus component. This is important in view of the guidance function which they must perform.

It is found to be very advantageous when the spring passes through an opening formed in the integral hinge, thus forming a very compact instruction. Suitably, the opening is then formed as a slot which extends to one end of the integral hinge and which is open at one end, resulting in a simple mounting of the spring.

Suitably, the drivable apparatus component to be guided in parallel, together with the integral hinges and the springs, takes the form of a structural unit which can be fitted onto the apparatus housing. Such a structural unit may for example serve for driving massage attachments, nail polishers etc. and may take the place of a shaving head of a dry-shaving apparatus.

In an equally advantageous embodiment, the drivable apparatus component to be guided in parallel comprises at least two parts, one part being connected to the integral hinges and taking the form of a coupling member for the drive element, and the other part being acted on by the springs associated with the integral hinges, the other part being detachably connected to this coupling member. Thus, by a suitable choice of springs, the correct resonant frequency for the complete vibrating system can be determined for any type of tool in a particularly simple manner. In this respect it is also found to be advantageous, in view of a simple construction, if the coupling member which is connected to the integral hinges is accommodated in the apparatus housing, and the second part together with the springs takes the form of a structural unit which can be fitted onto the apparatus housing.

The invention will be described hereinafter with reference to the drawings which show several exemplary embodiments to which the invention is not limited, and wherein FIG. 1 is a sectional view of a dry-shaving apparatus with a vibratory bridge, which is parallel-guided by four integral hinges, a leaf spring being provided for every two integral hinges;

Figure 1:
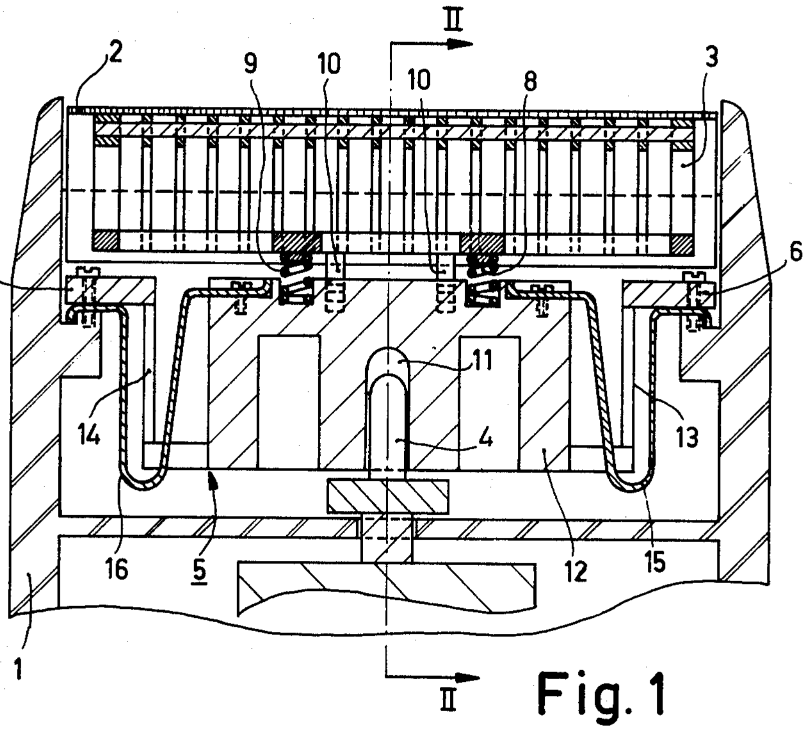
Figure 2:
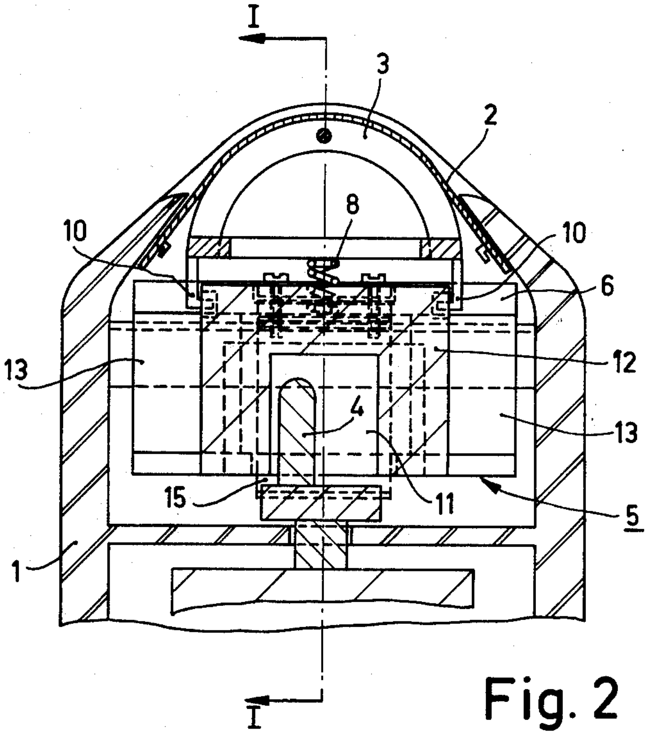
FIG. 2 shows the apparatus of FIG. 1 in cross-section in accordance with the line II—II in FIG. 1.

In FIG. 1 the reference numeral 1 refers to the housing of a dry-shaving apparatus, which comprises an eccentric pin 4 as the drive-element for a lower cutter 3 which co-operates with a shear foil 2 and performs a reciprocating vibratory movement. The lower cutter 3 is then disposed on vibratory bridge 5, which is attached to the housing 1 with its free ends 6 and 7. Between the lower cutter 3 and the vibratory bridge 5 helical screws 8, 9 are active, which keep the lower cutter in engagement with the shear foil 2. Via hooks 10, viewed in the direction of the vibratory movement, a non-positive connection is established between the lower cutter and the vibratory bridge. The eccentric pin 4 engages a slot 11 in the basic body 12 of the vibratory. In order to guarantee a perfect shaving performance, it is necessary that the lower cutter 3 always snugly engages with the shear foil 2. In order to achieve this, it is necessary that the lower cutter 3 together with the vibratory bridge 5 performs an exactly rectilinear movement, i.e. that for these driven apparatus parts a parallel guidance is provided. For such a parallel guidance it proves to be advantageous to use integral hinges, which are disposed at the sides of the apparatus component to be drive and which face each other in the direction of the vibratory movement. In the present example two integral hinges are provided at each side of the basic body 12 of the vibratory bridge. These integral hinges consist of strip-shaped parts 13 and 14 respectively, which connect the basic body 12 of the vibratory bridge to the free ends 6 and 7 respectively thereof in a resilient and pivotable manner. The strip-shaped parts 13 and 14 respectively, which each constitute two integral hinges at one side of the basic body 12, are parallel to each other, but with a mutual spacing in one plane, as can be seen in FIG. 2. In order that the integral hinges can take up the forces which occur at the apparatus component to be driven during operation of the apparatus, the end of each integral hinge which is connected to the drivable apparatus component to be guided in parallel. is disposed nearer the centre of the apparatus than the free end of each integral hinge which is connected to the stationary part of the apparatus, in the present instance to the free end 6 or 7 respectively of the vibratory bridge. Suitably, such vibratory bridge is manufactured integrally with the integral hinges from a plastic.

In practice it has been found that the life of such integral hinges is not too long. In order to mitigate this drawback, in accordance with the invention, a spring 15 and 16 respectively has been provided for the integral hinges 13 and 14 at each side of the basic body 12 of the vibratory birdge, which exerts a force component in the direction of the vibratory movement. In the present instance these springs 15 and 16 respectively are constituted by leaf springs which are bent into a U-shape, which are disposed between the strip-shaped portions 13 and 14 respectively, bearing against the basic body 12 of the vibratory bridge with one leg and against the housing 1 with the other leg. Thus, the springs primarily take up the forces or torques exerted by the drive system, whereas the integral hinges provide the parallel guidance of the apparatus component to be driven, in the present instance the vibratory bridge 5 and the lower cutter 3. Thus, the life of the integral hinges increases substantially.

Figure 3:
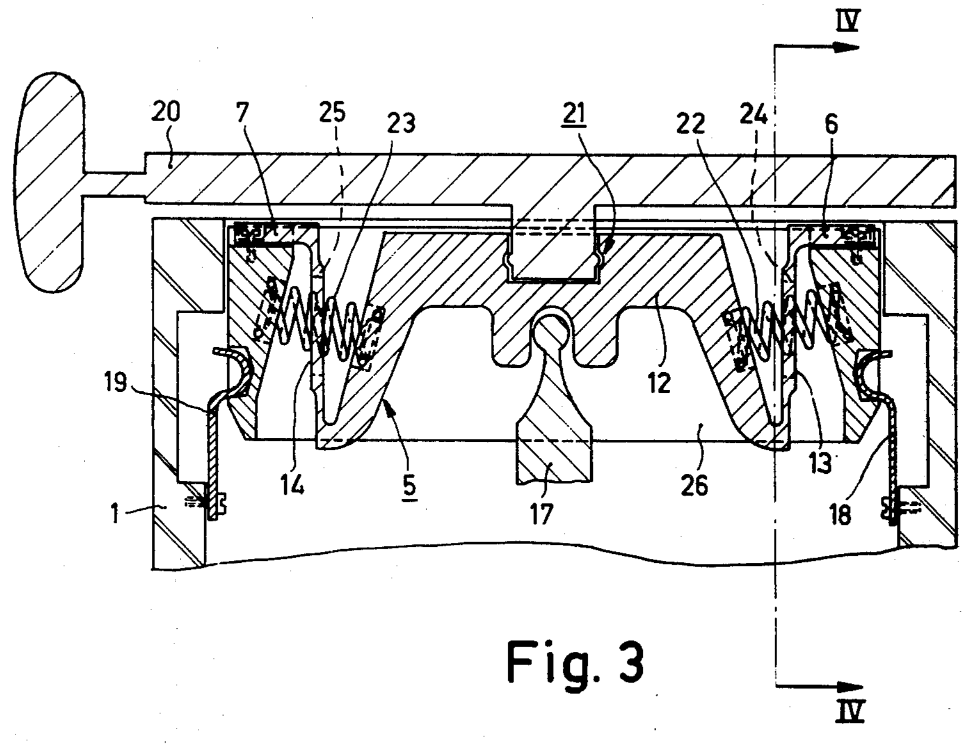
FIG. 3 shows a basic apparatus, onto which a vibratory bridge with a massage attachment is fitted as a structural unit, two helical screws being provided for each integral hinge.
Figure 4:
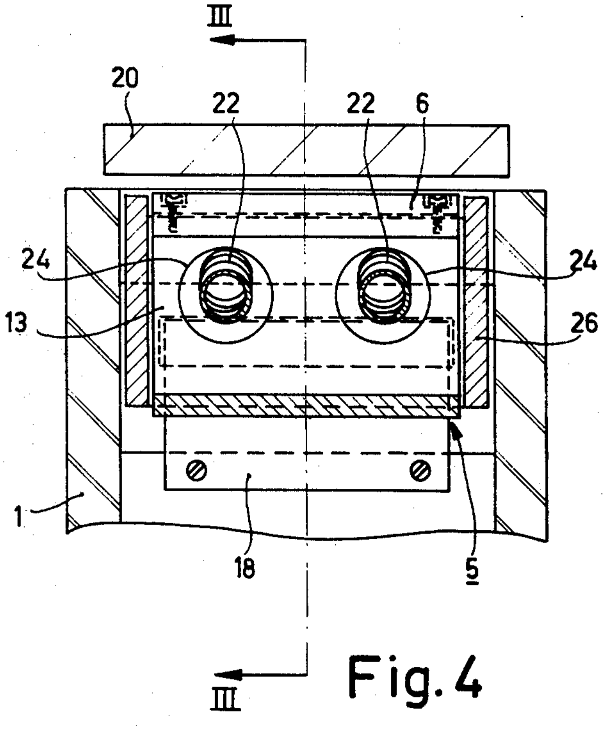
FIG. 4 shows the apparatus of FIG. 3 in cross-section in accordance with the line IV—IV in FIG. 3.

The example in accordance with FIGS. 3 and 4 is an electromotively driven apparatus, which may be used both as a shaving apparatus and as a massage apparatus, or generally speaking as a personal care apparatus. With this apparatus various attachments can be fitted onto the housing 1 of a basic apparatus, which attachments when they are fitted can each time be coupled to the drive element of the basic apparatus, in the present case the free end of a vibrating armature lever. FIGS. 3 and 4 by way of example show a massage attachment which together with a vibratory bridge 5 is fitted onto the basic apparatus, the fitted structural unit being detachable retained to the basic apparatus by means of retaining springs 18 and 19. For the transmission of the reciprocating vibratory movement of the vibrating armature lever 17 to the actual massage attachment 20 a vibratory bridge 5 is used again, onto whose basic body 12, which performs the reciprocating movement, the actual attachment 20 can be fitted by means of a snap connection 21, so that for example also other attachments, such as a nail polisher etc., can be connected to the vibratory bridge. For the parallel guidance of the apparatus component to be driven the vibratory bridge 5 again comprises integral hinges at those sides of its basic body 12 which face each other in the direction of the vibratory movement, which hinges in the present instance each consist of a strip-shaped part 13 and 14.

In the present example, as is shown in FIG. 4, two helical springs 22 and 23 are associated with each of the two integral hinges 13 and 14 respectively, which springs extend through openings 24 and 25 respectively formed in the integral hinges. With their free ends the helical springs at one side bear against a stationary part, namely a carrier 26 of the structural unit, to which also the ends 6 and 7 of the vibratory bridge are secured, and at the other side against the reciprocatable basic body 12 of the vibratory bridge 5. The helical springs are then arranged slightly obliquely with respect to the direction of the vibratory movement, so that they each do not only exert a force component which acts in the direction of the vibratory movement, but also a further force component which is essentially oriented in the direction of the centre of the apparatus, which component always keeps the relevant integral hinge tensioned, which is important in view of an exact parallel guidance. Apart from the fact that by providing the springs 22 and 23 the life of the integral hinges 13 and 14 is again substantially extended, a suitable dimensioning of these springs also enables the resonant frequency of the complete vibrating system to be determined accordingly, in which respect it may also be effective to use for example elastic damping buffers made of rubber as springs.

Figure 5:
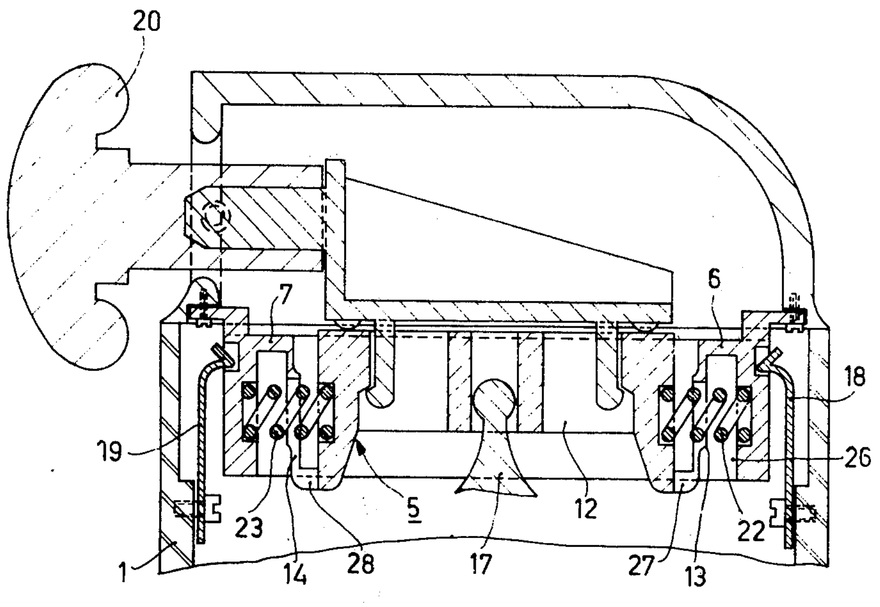
FIG. 5 shows a modification of the embodiment of FIG. 3, only one helical sprig being provided for each integral hinge.

The example in accordance with FIG. 5 again relates to a massage device which is fitted onto a basic apparatus, only one helical spring 22 or 23 being provided for each of the two integral hinges 13 and 14 respectively. Each of the two helical springs again extends through an opening in the relevant integral hinge, which opening in the present instance takes the form of a slot 27 or 28 which extends up to the end of the integral hinge and which is open at one end, so that the springs can be fitted in the oscillation bridge in a particularly simple manner, by simply inserting them into the slot. The attachment 20, the vibratory bridge 5, and the springs 22 and 23 again form a structural unit, which can be fitted onto the basic apparatus, to which it is then detachably retained by the retaining springs 18 and 19, so that the basic apparatus can also be used in conjunction with other attachments, such as for example a shaving head of a dry-shaving apparatus.

Figure 6:
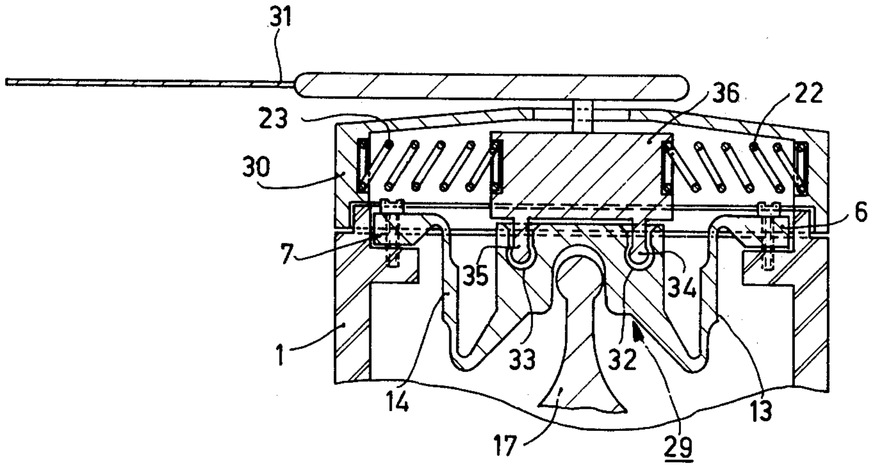
FIG. 6 shows an apparatus with a vibratory bridge, which consists of two parts, one part co-operating with the integral hinges and the other part with the springs.

In the example in accordance with FIG. 6 the apparatus component to be driven comprises several parts. One part thereof is a coupling member 29, which co-operates directly with the drive element, in the present instance again a vibrating armature lever 17. This coupling member 29 comprises the integral hinges 13 and 14, via which it is connected to the housing 1 of the basic apparatus. The attachment to be driven, in the present instance a nail polisher 31 with a separate housing cover 30 can be fitted onto this basic apparatus. When the attachment is fitted, a detachable connection is established again between the attachment and the coupling member 29 for example in that projections 34 and 35 snap into the openings 32 and 33 formed in the coupling member 29, which projections are formed on an attachment support 36 which is connected to the nail polisher 31 and which is accommodated in the housing cover 30 so as to be movable substantially freely. The helical springs 22 and 23 associated with the integral hinges 13 and 14 co-operate with this support 36, which springs at one side bear with their free ends against the support 36 and at the other side against the housing 30. Thus, together with the attachment 31, the attachment support 36 and the housing cover 30 the springs 22 and 23 constitute a structural unit which can be fitted onto the basic apparatus. The integral hinges 13 and 14, however, together with the coupling member 29 form part of the basic aparatus. In this way it is possible to select the resonant frequency to suit each attachment to be fitted onto the basic apparatus, since the springs 22 and 23 by means of which this is effected form part of the relevant structural unit to be fitted onto the basic apparatus. Thus, the apparatus always operates under optimum operating conditions, even when different attachments employed. In spite of the resulting relative spatial separation of the integral hinges from their associated springs, these springs again take up alternate tensile and pressure loads, so that also in this case the life of the integral hinges is extended. It is further obvious in this example that the springs 22 and 23 may be arranged slightly obliquely relative to the direction of the vibratory movement in order to keep the integral hinges 13 and 14 tensioned.

As is evident from the above examples, several modifications are possible in respect of the construction and arrangement of the integral hinges and their associated springs, without departing from the scope of the invention.

What is claimed is:

1. An electromotively driven apparatus comprising an apparatus component, an electromotively driven element adapted to drive said component in a reciprocating vibratory movement, means for parallel guiding said component, said means for parallel guiding positioned at each facing side of said component in the direction of said vibratory movement and comprising at least one strip-shaped integral hinge having one end hinged to said drivable apparatus component and the other end hinged to a stationary part of said apparatus, each of said two integral hinges including at least one spring mounted with respect to said hinge for exerting a force component in the direction of said vibratory movement, said spring acting between said drivable apparatus component to be parallel guided and said stationary part of said apparatus.

2. An apparatus as claimed in claim 1, wherein said spring exerts a further force component which is directed perpendicularly to said vibratory movement and which tensions said integral hinge.

3. An apparatus as claimed in claim 1 wherein said sprig extends through an opening formed in said integral hinge.

4. An apparatus as claimed in claim 3, wherein said opening takes the form of a slot which extends up to one end of said integral hinge and which is open at one end.

5. An apparatus as claimed in claim 1, wherein said drivable apparatus component to be guided in parallel, together with said integral hinges and said springs, is a structural unit adapted to be fitted onto the apparatus housing.

6. An apparatus as claimed in claim 1, wherein said drivable apparatus component to be guided in parallel comprises two parts, one of said parts being connected to said integral hinges and comprising a coupling for the drive element, said springs associated with said integral hinges acting on the other of said parts and being adapted to be detachably connected to said coupling member.

7. An apparatus as claimed in claim 6, wherein said coupling member is connected to said integral hinges, and is adapted to be mounted in said apparatus housing, said second part together with said springs being a structural unit adapted to be fitted onto said apparatus housing.

8. The apparatus of claim 1 wherein each said spring is helical.

9. An electromotively driven housed apparatus construction comprising a reciprocatingly driven vibratory element having a plane of movement, first hinge means hingeably coupling one side of said element in said plane of movement to the housing of said apparatus, second hinge means hingeably coupling the other side of said element in said plane of movement to the housing of said apparatus, a first resilient springlike member coupled between said element and said housing for exerting a first force in said plane of movement between said housing and said element, and a second resilient springlike element for exerting a second force, opposite to said first force, in said plane of movement between said housing and said element, said resilient springlike elements taking up alternately occurring tensile and pressure loads, thereby relieving said hinges of said loads and thus substantially increasing the life of said hinges.

* * * * *